L. MORSE.
GEM SETTING.
APPLICATION FILED JUNE 25, 1906.
1,192,092.
Patented July 25, 1916.
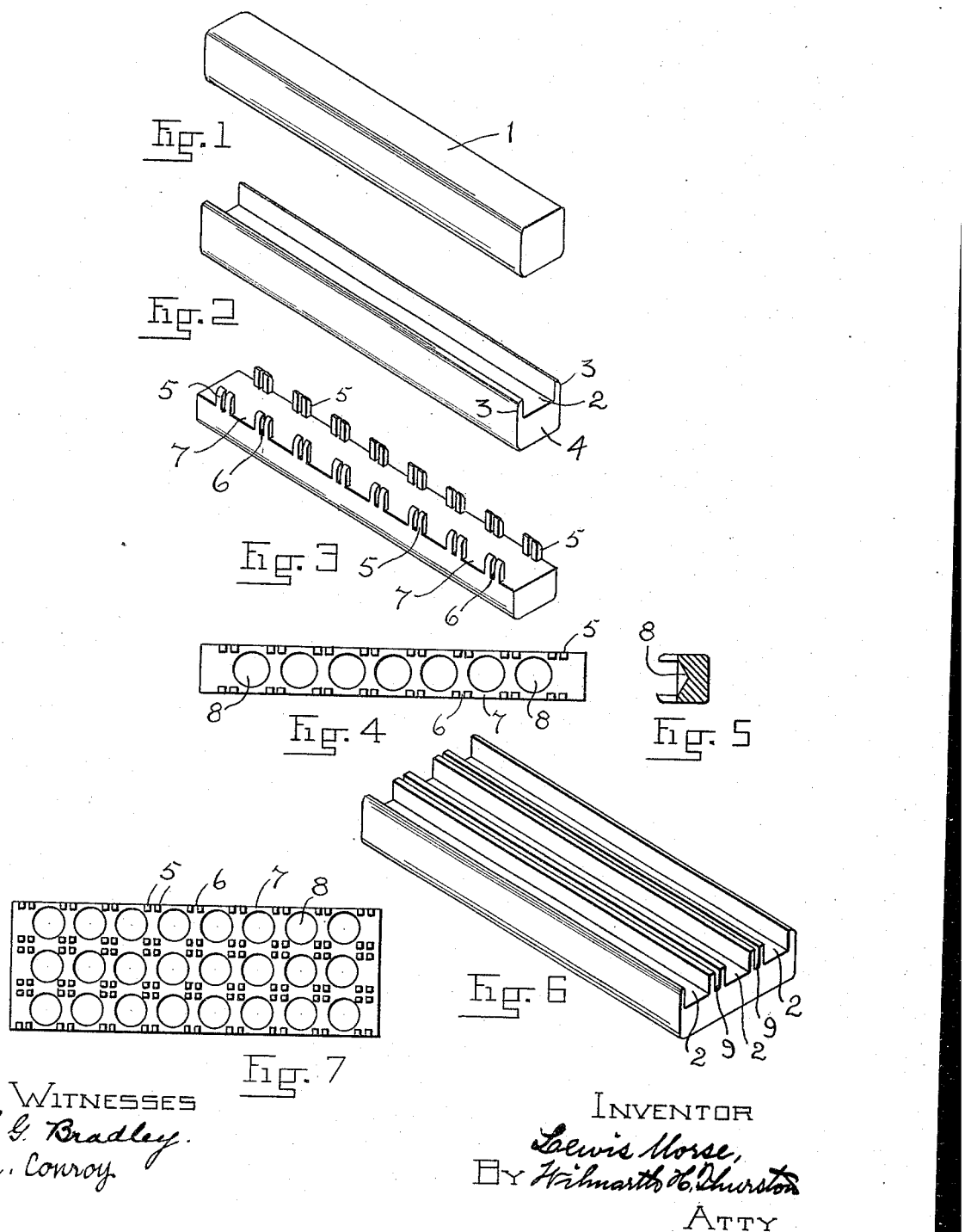

UNITED STATES PATENT OFFICE.

LEWIS MORSE, OF NORTH ATTLEBORO, MASSACHUSETTS, ASSIGNOR TO H. D. MERRITT COMPANY, OF NORTH ATTLEBORO, MASSACHUSETTS, A CORPORATION OF RHODE ISLAND.

GEM-SETTING.

1,192,092.   Specification of Letters Patent.   Patented July 25, 1916.

Application filed June 25, 1906. Serial No. 323,221.

*To all whom it may concern:*

Be it known that I, LEWIS MORSE, of North Attleboro, in the county of Bristol and State of Massachusetts, have invented certain new and useful Improvements in Gem-Settings; and I do hereby declare the following specification, taken in connection with the accompanying drawings, forming a part of the same, to be a full, clear, and exact description thereof.

The invention relates to a gem setting formed complete in a single piece from a bar of stock and with the body of the setting and the clamping prongs integral with each other.

The invention consists primarily in a gem-setting of the character referred to made from a bar of stock preferably square in cross-section or substantially so, and formed with a groove or channel lengthwise of said bar along one side thereof, and with the projecting flanges thus formed, cross-cut to form the clamping prongs.

The invention further consists in certain features hereinafter described and claimed.

Referring to the drawings, Figure 1 is a perspective view of the blank or bar of stock from which the settting is formed; Fig. 2 is a corresponding view showing the longitudinal groove or channel formed in one side of the bar; Fig. 3 is a perspective view, Fig. 4 a plan view and Fig. 5 a cross section of the bar after the cross-cuts have been made; Fig. 6 is a perspective view of a bar of stock having a series of longitudinal grooves or channels formed therein; and Fig. 7 is a plan view of the setting as formed therefrom.

In making the setting I employ a bar of stock 1 substantially square in cross section, except that preferably the bar is rounded off somewhat at the corners, as shown in Fig. 1. In one side of this bar I form by cutting, rolling or otherwise, a groove or channel 2 extending lengthwise of said bar, thereby forming the projecting flanges 3, 3, the remainder of the bar constituting the body portion 4 of the setting, as shown in Fig. 2. Then by means of a saw, bur, or other suitable tool I cross-cut the flanges 3, and thereby form two series of clamping prongs 5 projecting from the body portion 4, one series of said prongs projecting from said body portion along each edge thereof, as shown in Fig. 3. As will be seen, there will thus be formed four prongs for holding each stone. While the cross-cuts may be made separately, or one at a time, it is preferred to employ a series or gang of cutting tools arranged to operate simultaneously upon the stock, and thus make a corresponding number of the cross-cuts simultaneously.

Preferably the prongs 5 are to be made in pairs and with only a comparatively narrow space between the two prongs comprising each pair, as shown in Fig. 3, and so as to thus bring adjacent gems or stones correspondingly close together. In order to do this, all that is necessary is to make up the gang of cross-cut tools accordingly, that is, with a number of narrow face tools and a number of wide face tools arranged alternately in the gang, and so that the narrow face tools will make the narrow cuts 6 and the wide face tools will make the wider cuts 7.

When the gems or stones to be set have conical or pointed backs, the setting is to be further provided with the series of countersunk recesses 8, which recesses may be produced by drilling, rolling, or in any other suitable manner. When these recesses are formed by drilling a series or gang of drills may be employed whereby a corresponding number of said recesses may be formed simultaneously.

If desired a setting adapted to receive several rows of stones may be readily constructed by the same method, as shown in Figs. 6 and 7, which show a setting adapted to receive three such rows. To produce such a setting it is simply necessary to employ a bar of stock of sufficient width, and to form therein the requisite number of grooves or channels 2, together with the additional intermediate grooves 9, and so that when the necessary cross-cuts have been made there will be, as before, four clamping prongs for each stone, as clearly shown in Fig. 7. It will be obvious that a setting adapted to receive any desired number of rows of stones may be produced in the same manner. When a setting thus adapted to receive several rows of stones is to be made and the grooves 2 and 9 are to be formed by cutting, it is preferred, as in the case of making the cross-cuts, to employ a gang of saws or other tools comprising the proper number of wide face tools and narrow face tools to form all of the grooves 2 and 9 simultaneously, although of course these several grooves may be formed separately if desired.

With the method above described settings may be produced at much less expense than by any method previously employed, while at the same time the setting itself is superior to the settings heretofore constructed. In addition to the cheapness of production, the method described possesses other important and distinctive advantages. Thus with such method the length of the prong is determined by the depth of the groove 2 and of the cross-cuts 6 and 7, and as a result the length of the prongs may be varied at will by simply varying the depth of such groove and cross-cuts. So also settings adapted to receive and hold stones of different sizes may be readily constructed by simply varying the width of the grooves 2 or of the cross-cuts 7, or both, and if desired the width of the cross-cuts may be varied in one and the same setting, and so that such single setting may be adapted to receive stones of varying dimensions measuring lengthwise of the setting. As will be seen, all that is necessary in order to thus vary the width of either the groove 2 or the cross-cuts is simply to select cutting tools of the proper width of face.

As will be seen, the distance between adjacent stones when set will depend upon the width of the cross-cuts 6, and thus by varying the width of such cross-cuts the distance between adjacent stones may be correspondingly varied. As a thin saw may be employed for making these cross-cuts 6, such cross-cuts may be made very narrow and so as to bring adjacent stones close together, and if desired practically in contact with each other. This adds very much to the beauty and appearance of the finished article.

What I claim as my invention and desire to secure by Letters Patent is:

1. A multiple gem setting comprising a bar of metal having a longitudinally cut groove on one side and cut cross-grooves intersecting said groove, whereby the metal between said grooves projects from the base as prongs.

2. A multiple gem setting comprising a bar of metal having a longitudinally cut groove on one side and cut cross-grooves of substantially the same depth as and intersecting said groove, whereby the metal between said grooves projects from the base as prongs.

3. A multiple gem setting comprising a bar of metal having a longitudinally cut groove on one side and cut cross grooves intersecting said groove, whereby the metal between said grooves projects from the base as prongs, and cut depressions in the base between said cut-grooves.

4. In a gem setting a bar of metal having a series of upstanding prongs arranged in pairs along the side edges of said bar, the relative positions of the prongs upon one side edge corresponding with those upon the opposite side edge, the corresponding pairs of prongs upon opposite side edges marking off the face of the bar into sections.

5. In a gem setting a bar of metal having a series of upstanding prongs arranged in pairs along the side edges of said bar, the relative positions of the pairs upon one side edge corresponding with those upon the opposite side edge, the corresponding pairs of prongs upon opposite side edges marking off the face of the bar into substantially square sections.

6. In a gem setting a bar of metal having a series of upstanding prongs arranged in pairs along the side edges of said bar, the relative positions of the prongs upon one side edge corresponding with those upon the opposite side edge, the corresponding pairs of prongs upon opposite side edges marking off the face of the bar into substantially square sections, each of these sections having a conical depression in the center thereof for the reception of a gem.

LEWIS MORSE.

Witnesses:
W. H. THURSTON,
C. G. BRADLEY.

Copies of this patent may be obtained for five cents each, by addressing the "Commissioner of Patents, Washington, D. C."